Apr. 17, 1923.
I. W. CEDERBERG
APPARATUS AND METHOD FOR CARRYING OUT CATALYTIC OXIDATION OF
AMMONIA WITH OXYGEN
Filed March 14, 1922
1,452,145
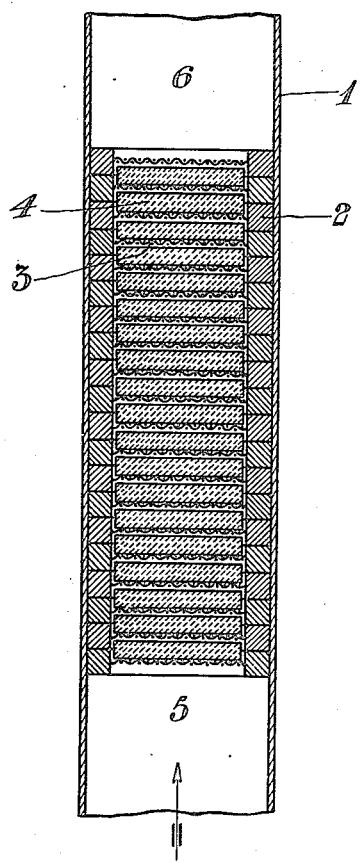
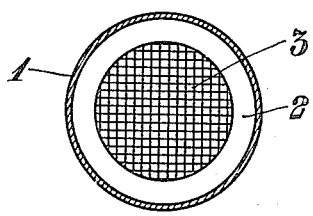
Inventor:
Ivar W. Cederberg.

Patented Apr. 17, 1923.

1,452,145

UNITED STATES PATENT OFFICE.

IVAR WALFRID CEDERBERG, OF BERLIN, GERMANY.

APPARATUS AND METHOD FOR CARRYING OUT CATALYTIC OXIDATION OF AMMONIA WITH OXYGEN.

Application filed March 14, 1922. Serial No. 543,770.

*To all whom it may concern:*

Be it known that I, IVAR WALFRID CEDERBERG, a subject of the King of Sweden, residing at Berlin, Germany, have invented a new and useful Improvement in Apparatus and Method for Carrying Out Catalytic Oxidation of Ammonia with Oxygen, of which the following is a specification.

In certain cases great technical difficulties are met with in carrying out such catalytic reactions between gases which involve the generation of very high heat. This is the case for instance in the catalytic oxidation of ammonia by the use of pure oxygen instead of air or other mixtures containing oxygen. The reaction

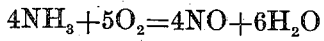

$$4NH_3 + 5O_2 = 4NO + 6H_2O$$

involves the generation of exceedingly high heat, namely approximately 215600 calories, and further, ammonia-oxygen mixtures having a high percentage of ammonia are explosive, owing to which circumstances the said process of oxidation cannot be carried out in the apparatus ordinarily used for combustion of ammonia by means of air. In view of the fact, however, that the oxidation of ammonia by means of oxygen would involve considerable practical advantages, it has been a desideratum to be able to carry out the said reaction on a technical scale.

Now, the present invention refers to an apparatus and method by means of which catalytic oxidation of ammonia by means of oxygen may be carried out without the risk of too high an increase of temperature and without danger of explosion. The invention is based on the discovery that a catalytic combustion of ammonia-oxygen mixtures containing up to 35 to 40 per cent ammonia may be carried out without danger of explosion, by the catalyst, for instance finely divided platinum, being precipitated on contact carriers in such manner that the concentration of the catalyst in the zone of combustion is gradually increased, for instance in a geometrical or arithmetical progression, so that the concentration is least in the portion of the catalyst where the gas mixture enters, and is highest where the gases of reaction are discharged. In this manner it is attained that the principal combustion is not localized to the front portions of the catalyst, which would result in a high increase of temperature and danger of explosion, but is distributed within the entire zone of combustion.

The apparatus according to the present invention consists in well known manner of a flow vessel in which there is a catalyst zone, and is thus principally characterized by this that within said zone the concentration of the catalyst is increased from the inlet end towards the outlet end of the vessel.

In the accompanying drawing an embodiment of an apparatus according to the invention is illustrated diagrammatically, Fig. 1 showing a longitudinal section and Fig. 2 a cross section of the apparatus.

The apparatus consists of a reaction tube 1 of for instance nickel or aluminium, in which there is a series of metal rings 2 arranged in abutting relation. A metal netting 3 is secured within each ring 2. The rings 2 as well as the nettings 3 are made of catalytically inactive material, for instance nickel. In the spaces formed between the different nettings 3 contact carriers, for instance in the shape of porous plates 4 of pumice-stone, are placed on which plates the catalyst has been precipitated with a varying concentration, so that the concentration of the catalyst is increased from the inlet end 5 towards the outlet end 6. The metal nettings 3 and the rings 2 serve to conduct heat from the combustion zone and to increase the radiation of heat from the same so that too high an increase of the temperature is avoided.

I claim:

1. An apparatus for carrying out catalytic oxidation of ammonia with oxygen, comprising a flow vessel in which there is a catalyst zone, and a catalyst in said zone the concentration of which catalyst increases from the inlet end towards the outlet end of the vessel.

2. An apparatus for carrying out catalytic oxidation of ammonia with oxygen, comprising a flow vessel in which there is a catalyst zone, catalyst units in said zone said units having different concentration increasing from the inlet end towards the outlet end of said vessel, and heat conductors of catalytically inactive material placed between said units.

3. An apparatus for carrying out catalytic oxidation of ammonia with oxygen, comprising a flow vessel in which there is a catalyst zone, catalyst units in said zone said units having different concentration increasing from the inlet end towards the outlet end of said vessel, and heat conductors of catalytically inactive metal netting placed between said units.

4. A method for the catalytic oxidation of ammonia with oxygen, which consists in passing a mixture of ammonia and oxygen through a catalyst zone, the concentration of said catalyst in the zone of combustion being increased in the direction in which the gases flow.

IVAR WALFRID CEDERBERG.